United States Patent

Ellis

[11] Patent Number: 5,907,717
[45] Date of Patent: May 25, 1999

[54] CROSS-CONNECTED MEMORY SYSTEM FOR ALLOCATING POOL BUFFERS IN EACH FRAME BUFFER AND PROVIDING ADDRESSES THEREOF

[75] Inventor: Jackson L. Ellis, Fort Collins, Colo.

[73] Assignee: LSI Logic Corporation, Milpitas, Calif.

[21] Appl. No.: 08/605,965

[22] Filed: Feb. 23, 1996

[51] Int. Cl.[6] ........................................... G06F 12/02
[52] U.S. Cl. .......................... 395/876; 370/360; 370/426; 711/149; 711/150; 711/153
[58] Field of Search ................... 395/876, 446, 395/872, 501, 478, 463; 370/360, 426

[56] References Cited

U.S. PATENT DOCUMENTS

| | | | |
|---|---|---|---|
| 3,924,245 | 12/1975 | Eaton et al. | 395/421.09 |
| 4,158,235 | 6/1979 | Call et al. | 395/876 |
| 4,509,119 | 4/1985 | Gumaer et al. | 395/463 |
| 4,554,659 | 11/1985 | Blood et al. | 370/437 |
| 4,644,529 | 2/1987 | Amstutz et al. | 370/422 |
| 4,845,710 | 7/1989 | Nakamura et al. | 370/360 |
| 5,093,912 | 3/1992 | Dong et al. | 395/764 |
| 5,161,215 | 11/1992 | Kouda et al. | 395/446 |
| 5,233,603 | 8/1993 | Takeuchi et al. | 370/412 |
| 5,233,606 | 8/1993 | Pashan et al. | 370/418 |
| 5,237,661 | 8/1993 | Kawamura et al. | 395/872 |
| 5,278,828 | 1/1994 | Chao | 370/394 |
| 5,287,346 | 2/1994 | Bianchini, Jr. et al. | 370/390 |
| 5,289,470 | 2/1994 | Chang et al. | 295/497.04 |
| 5,291,482 | 3/1994 | McHarg et al. | 370/413 |
| 5,315,707 | 5/1994 | Seaman et al. | 395/876 |
| 5,327,422 | 7/1994 | Abefelt et al. | 370/371 |
| 5,333,269 | 7/1994 | Calvignac et al. | 395/200.45 |
| 5,367,643 | 11/1994 | Chang et al. | 395/309 |
| 5,406,556 | 4/1995 | Widjaja et al. | 370/381 |
| 5,412,781 | 5/1995 | Lukas et al. | 395/876 |
| 5,432,908 | 7/1995 | Heddes et al. | 295/495 |
| 5,440,545 | 8/1995 | Buchholz et al. | 370/426 |
| 5,483,578 | 1/1996 | Ackermann et al. | 379/67 |
| 5,530,871 | 6/1996 | Abe | 395/732 |
| 5,535,364 | 7/1996 | Resman et al. | 395/478 |
| 5,553,073 | 9/1996 | Barraclough et al. | 370/85.5 |
| 5,572,645 | 11/1996 | Dan et al. | 395/501 |
| 5,572,697 | 11/1996 | Chevalier et al. | 395/427 |
| 5,617,537 | 4/1997 | Yamada et al. | 395/200.44 |
| 5,680,551 | 10/1997 | Martino, II | 395/200.56 |
| 5,802,351 | 9/1998 | Frampton | 395/500 |

FOREIGN PATENT DOCUMENTS

| | | |
|---|---|---|
| 2856292 | 6/1993 | Australia . |
| 0272939 | 6/1988 | European Pat. Off. . |
| 0372765 | 6/1990 | European Pat. Off. . |
| 0545575 | 6/1993 | European Pat. Off. . |

OTHER PUBLICATIONS

IBM Technical Disclosure Bulletin; ATM Switch with Cut-Through Shared Buffers; vol. 37 No. 05; May 1994.

*Primary Examiner*—Thomas C. Lee
*Assistant Examiner*—Harold J. Kim
*Attorney, Agent, or Firm*—David K. Lucente

[57] ABSTRACT

A serial data interface device is coupled to electronic devices or other data transmitters or receivers, such as disk, optical, tape or CD-ROM drives, computers, printers, etc. The interface includes first and second ports capable of receiving and transmitting information to respective electronic devices, and first and second storage devices, such as frame buffers, for storing information. Each of the storage devices is coupled to both the first and second ports and are coupled to another electronic device. Included in each storage device is a main memory that is coupled to at least one of the electronic devices and at least one of the ports. A control memory that is coupled to the main memory is also included, along with a main memory arbiter that is coupled to the control memory and the main memory. Further included is a buffer allocation control that is coupled to the at least one electronic device and at least one of the ports. The main memory preferably includes at least four pool buffers which are allocated to data frames in a predetermined manner. The preferred method of allocating the pool buffers for inbound and outbound data comprises the steps of allocating a minimum number of pool buffers in each frame buffer for the inbound data and allocating a remaining number of pool buffers in each frame buffer for one of the inbound and outbound data. The method of allocating the pool buffers is preferably independent for each frame buffer. In addition, the pool buffers are dynamically allocated.

8 Claims, 4 Drawing Sheets

CROSS-CONNECTED MEMORY SYSTEM FOR ALLOCATING POOL BUFFERS IN EACH FRAME BUFFER AND PROVIDING ADDRESSES THEREOF

The present invention relates to a serial data interface and more particularly to an SSA serial interface cross-connected memory structure and method thereof.

BACKGROUND OF THE INVENTION

Serial storage architecture (SSA) is a serial interface which provides a flexible addressing scheme to allow the configuration of a web of two or more nodes into a loop or string configuration. The nodes are interconnected by links or switches. The nodes can be SSA combined with disk, optical, tape or CD-ROM drives, or printers. These nodes are known as "targets." A node can also be SSA integrated on a host adapter. The host adapter is typically associated with a computer, and this configuration is referred to as an "initiator." The web supports node-to-node (peer-to-peer) communication with information multiplexing between any pair of nodes. The link provides point-to-point physical connection between nodes. A standard link protocol allows operation at 20 MBytes/sec over distances up to 600 meters between nodes.

Multiple links can create strings or loops of nodes if the nodes utilize dual ports with cut-through routing. Each link provides full-duplex communication so that each port transmits on an outbound line subject to information received on an inbound line. The link is capable of a peak data rate of 20 MBytes/sec in each direction for a 40 MBytes/sec total bandwidth per port.

A unit of information transferred over a link is a "frame." There are three types of frames: control, privileged and application. Each frame contains a control, an address, a data and a CRC field. A control field, one byte long, is used to identify the type of frame and the frame sequence number. The address field, from one to six bytes long, is used to route the frame to a destination node and to select the appropriate channel to a microprocessor, DMA or outbound port via cut-through. The data field, from zero to 128 bytes, provides information such as data, messages, etc. The CRC field, four bytes long, contains frame parity and end-of-frame data.

Figure 1:
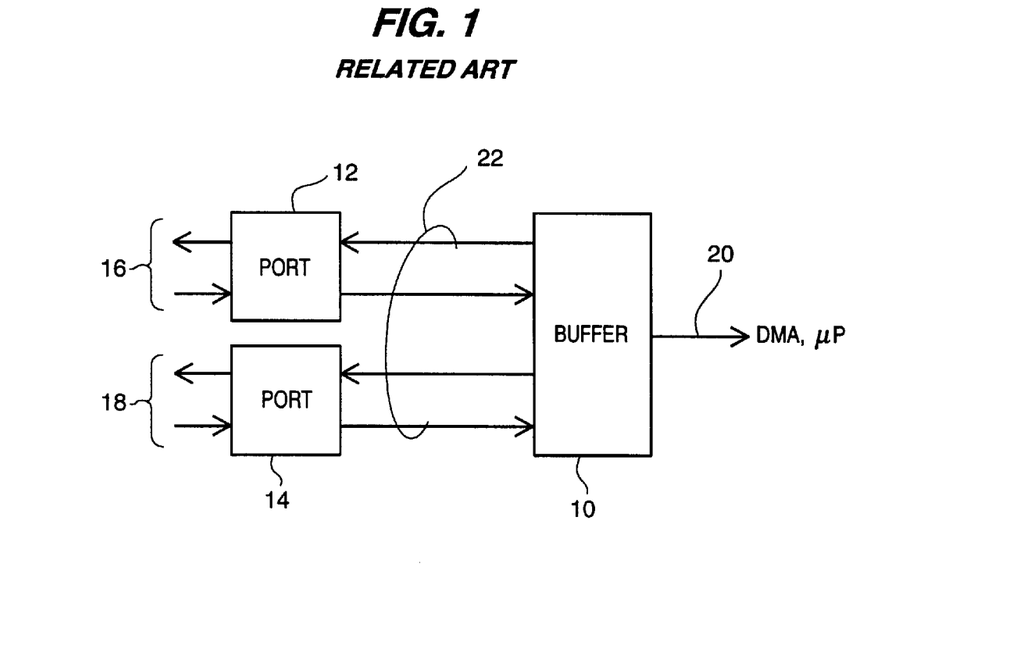
FIG. 1 is a block diagram of a related art SSA port buffer configuration.

One SSA configuration, as illustrated in FIG. 1, utilizes a single buffer RAM 10 for both ports 12, 14. RAM 10 has inbound and outbound buffers that are dedicated to each of ports 12, 14. As frames arrive from SSA links 16 and 18 to ports 12, 14, they are routed to an inbound buffer for that respective port. The frame is then routed from the inbound buffer to one of several destinations, such as the other port, to firmware associated with a microprocessor μP via lead 20, or to a local DMA channel also via lead 20. Concurrently, buffers are being filled with frames by the local DMA channel or the firmware to be sent outbound across the link 16 or 18.

RAM 10 must support 20 MBytes/sec for each of the four leads of bus 22 and 40 Mbytes/sec on lead 20. This translates to a total bandwidth of 120 MBytes/sec that RAM 10 must support. In addition, one or more DMA channels, DMA SMS automation channels and a firmware channel can require guaranteed buffer access. Thus, RAM 10 must be correspondingly fast. Such a fast RAM needs an increased area due to a wider data path or double-banked structure. This will increase the cost of RAM 10 accordingly. Transfer rates for each of the four leads of bus 22 and lead 20 can increase to 40 MBytes/sec, for example. RAM 10 would therefore need a further increase in area, which would result in a further increase in cost.

The double-banked structure has two arrays which are typically accessed alternately to achieve maximum bandwidth. A disadvantage of this structure is that all channels may not have guaranteed access. For example, a first port channel is given access to RAM 10 by a time-multiplexed slot arbiter. A second port then requests access to RAM 10. However, the second port that requests the access requires access to the array that the first port accessed. Since the double-banked structure must access the other non-requested array before allowing access to the requested array, the second port access is delayed to the requested array. The history of the RAM 10 access can affect future access time. Consequently, that effect limits the bandwidth of RAM 10. It may be possible to have an architecture for the double-banked structure to overcome this, but that architecture would be required to provide guaranteed access to all channels at the required bandwidth while maintaining the alternate access of the arrays. Such an architecture would be more complex than the architecture presently known, and would therefore be more expensive and require more chip area.

A further disadvantage of the FIG. 1 configuration is that, typically, there is a need for more inbound buffers than outbound buffers. However, the FIG. 1 configuration uses two dedicated inbound and two dedicated outbound buffers per port. With this scheme, the outbound buffers can be inactive. For example, if the internal DMA channels are either inactive or are servicing write commands from a port, then the two outbound buffers for this port are idle. That scheme does not provide for the use of the idle outbound buffers, where such use could benefit the transfer rate of the inbound frames. Further, this scheme may not provide optimal transfer rates for different environments that use an SSA serial interface.

Therefore, there exists a need for an SSA serial interface that can support increased data rates, different environments and expansion without a corresponding substantial increase in cost, and can utilize available memory more efficiently to provide better transfer rates. The present invention meets this need.

SUMMARY OF THE INVENTION

A serial data interface device is coupled to electronic devices or other data transmitters or receivers, such as disk, optical, tape or CD-ROM drives, computers, printers, etc. The interface includes first and second ports capable of receiving and transmitting information to respective electronic devices, and first and second storage devices, such as frame buffers, for storing information. Each of the storage devices is coupled to both the first and second ports and are coupled to another electronic device.

Included in each storage device is a main memory that is coupled to at least one of the electronic devices and at least one of the ports. A control memory that is coupled to the main memory is also included, along with a main memory arbiter that is coupled to the control memory and the main memory. Further included is a buffer allocation control that is coupled to at least one electronic device and at least one of the ports.

The main memory preferably includes a minimum of four pool buffers which are dynamically allocated to data in a predetermined manner. The preferred method of allocating the pool buffers for inbound and outbound data comprises the steps of allocating a minimum number of pool buffers in each frame buffer for the inbound data and allocating a remaining number of pool buffers in each frame buffer for one of the inbound and outbound data. The method of allocating the pool buffers is preferably independent for each frame buffer. In addition, the pool buffers are dynamically allocated.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENT

While this invention is susceptible of embodiment in many different forms, there are shown in the drawings and will be described herein in detail specific embodiments thereof with the understanding that the present disclosure is to be considered as an exemplification of the principles of the invention and is not to be limited to the specific embodiments described.

Figure 2:
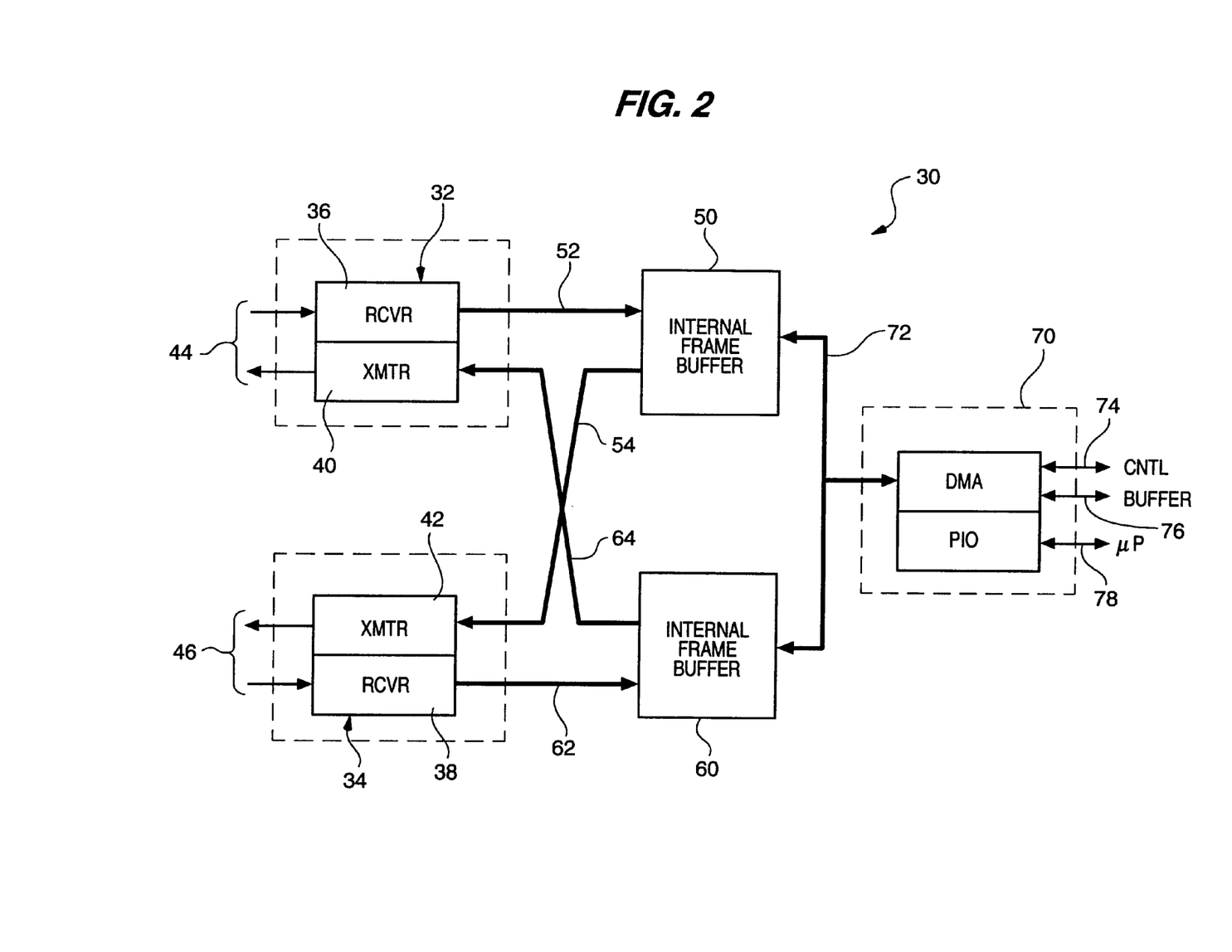
FIG. 2 is a block diagram of the preferred embodiment of the present invention.

FIG. 2 is a block diagram of the preferred embodiment of the present invention. Serial data interface 30 includes ports 32, 34 that each have integrated receivers 36, 38 and transmitters 40, 42, respectively. Preferred bi-directional leads 44 and 46 are respective links that are connected to nodes that have an electronic device, such as a disk drive, computer, printer, etc., or other data transmitters or receivers.

A storage device, such as internal frame buffer 50, receives frames from port 32 via lead 52. Internal frame buffer 50 outputs information to port 34 via lead 54. Another storage device, internal frame buffer 60, receives information from port 34 via lead 62, and transmits information to port 32 via lead 64. The provision of the cross-coupling of ports 32, 34 with internal frame buffers 50, 60 allows for a more efficient frame cut-through between ports 32 and 34.

Internal frame buffers 50, 60 are connected to a NODE 70 via a bi-directional lead 72. NODE 70 includes circuitry that communicates with other electronic devices, for example, a disk drive and a microprocessor or microcontroller (not shown) through leads 74, 76 and 78. Data can be conveyed between leads 44, 46 and leads 76, 78. The term "inbound" is used with respect to a frame transfer from either ports 32 or 34 to NODE 70, and the term "outbound" is used with respect to a frame transfer from NODE 70 to either port 32 or 34. These terms are used relative to the preferred embodiment of the present invention, and are not meant as limitations to the present invention.

One benefit of having two internal frame buffers 50, 60 is that each supports less bandwidth than one frame buffer, such as RAM 10 in FIG. 1. Internal frame buffer 50 supports the 20 MBytes/sec of leads 52, 54 and 40 MBytes/sec of lead 72 for a total of 80 MBytes/sec. Likewise, internal frame buffer 60 supports a total of 60 MBytes/sec. Each internal frame buffer 50, 60 supports less than the 100 MBytes/sec that RAM 10 must support. RAM 10 supports the higher bandwidth by having, for example, wider data paths or double-banked structures. This causes RAM 10 to be more expensive than internal buffers 50, 60. In addition, increasing the bandwidth that internal frame buffers 50, 60 and RAM 10 support will cause RAM 10 to still be more expensive than internal buffers 50, 60. Providing at least two internal frame buffers provides a capability to provide 40 MBytes/sec link information transfers.

Another advantage of the present invention is that, compared to a double-banked RAM structure, frame buffers 50, 60 operate completely independent due to the use of the preferred connections to ports 32, 34. This allows the buffer allocation control device 102 to be efficient and not lose any bandwidth during channel switching since ports 32, 34 would not be exposed to the access delay inherent in that double-banked RAM structure.

Figure 3:
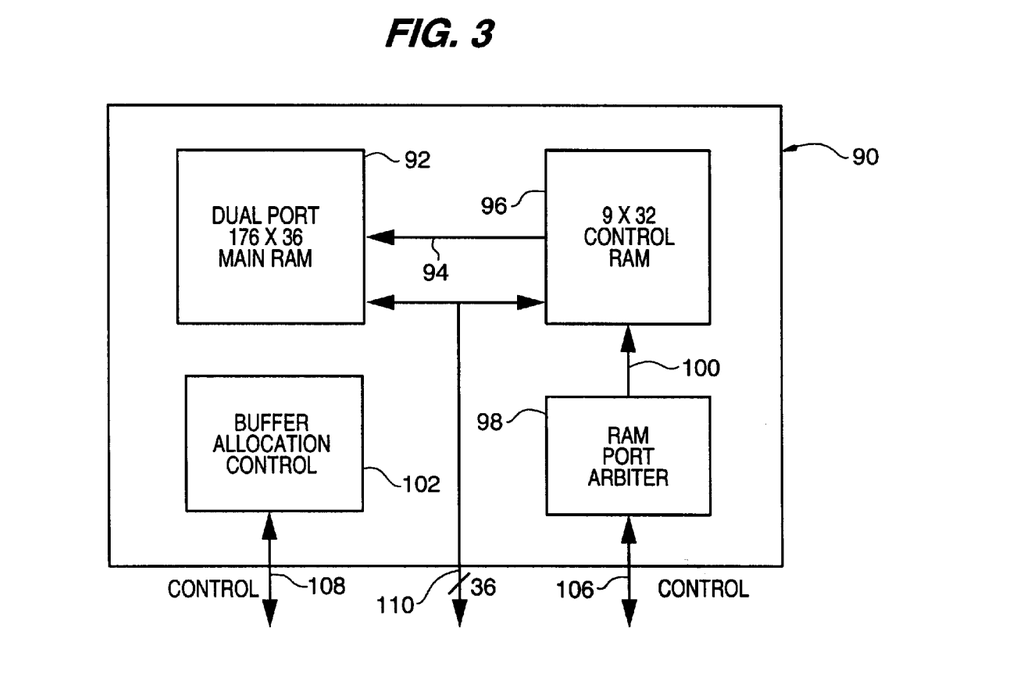
FIG. 3 is a block diagram of an internal frame buffer shown in FIG. 2.

FIG. 3 illustrates a block diagram for each of internal frame buffers 50, 60 shown in FIG. 2. Internal frame buffer 90 preferably includes a 176×36 Main RAM (MRAM) 92 that receives preferred address information via a lead 94 from a 9×32 Control RAM (CRAM) 96. CRAM 96 is connected to a port arbiter 98 via lead 100. A buffer allocation control device 102 is also included in internal frame buffer 90.

Port arbiter 98 and buffer allocation control device 102 are coupled to respective leads 106 and 108. Lead 106 conducts signals which are used by port arbiter 98 to determine which channel obtains access to MRAM 92. The signals preferably include arbitration requests for access to MRAM 92, and the CRAM 96 address which contains the address to access MRAM 92. Lead 108 conducts pool buffer allocation requests from ports 32, 34, the DMA and microprocessor.

A lead 110 is coupled to both MRAM 92 and CRAM 94. Lead 110 is preferably a 36 bit bus coupled to the two ports of MRAM 92. Data written to and read from MRAM 92 and CRAM 96 are conveyed by lead 110. MRAM 92 preferably contains all of the frame buffers for the frames except for the link reset frames.

MRAM 92 is a preferred dual-port RAM with one port dedicated to the DMA channel 72 (shown in FIG. 2) and the other port dedicated to the link I/O (ports 32, 34 via leads 52, 54 or 62, 64 as shown in FIG. 2). MRAM 92 is preferably organized as 176 double or long words (four bytes) with every byte preferably protected by a parity bit which is set if the byte has an even number of 1's. Both MRAM ports operate at 25 MHz for a total of 200 MBytes/sec capability per link. The MRAM is functionally divided into the following frame buffers as appears in Table 1 below:

TABLE 1

| Firmware Outbound Message | 40 bytes |
| Hardware Outbound Message | 32 bytes |
| Reset | 8 bytes |
| Inbound Message A | 40 bytes |
| Inbound Message B | 40 bytes |
| Pool A | 136 bytes |
| Pool B | 136 bytes |
| Pool C | 136 bytes |
| Pool D | 136 bytes |

MRAM 92 is accessed through five channels which are preferably time multiplexed into slots through channel arbiter 98 on lead 110. The five channels are for inbound frames from ports 32, 34, outbound frames for ports 32, 34, DMA data frames in and out, automatic DMA SMS handling frames in and out, and microprocessor frames in and out. Channel arbiter 98 will give access to MRAM 92 and CRAM 96 to the highest priority requesting channel unless that channel is requesting more often than its assigned slot frequency. The DMA, inbound port (receiver 36 or 42 of port 32, 34), and outbound port (transmitter 38 or 40 or port 32, 34) each have am actual slot frequency of ¼ of a total 200 MBytes/sec bandwidth. This guarantees each channel 50 MBytes/sec throughput. Note that 200 MBytes/sec allows the DMA, inbound port, and outbound port to operate at 40 MBytes/sec while the microprocessor channel and automatic DMA SMS handling channel operate at 20 MBytes/sec.

At least four pool data buffers are preferably provided to handle application data frames. Each pool buffer can be allocated by either port 32 or 34 as an inbound or as an outbound buffer. When allocated for use in a link cut-through, or for an inbound or outbound microprocessor frame, the address field of the frame is not separated from the data field. This requires a maximum of 128 bytes of data plus six bytes of address in MRAM 92 to hold the frame. When allocated as a DMA inbound buffer, the address is stripped from the data so that the required storage is 128 bytes maximum for the frame. When allocated as a DMA outbound buffer, the address is preferably supplied by the DMA. The number of address bytes in the address field is automatically calculated using the rules of the SSA-PH.

It is preferred that at least two pool data buffers are always allocated as inbound frame data buffers, especially to avoid deadlock situations where a link receive ready (RR) signal cannot be sent from port 32 or 34. This also maintains the ability for inbound frames to ping-pong. "Ping-pong" means that as one pool data buffer is being written, another can be read. During periods where DMA read commands are not active, two additional pool buffers can be allocated to inbound transfers. This allows up to four inbound buffers at most and two inbound buffers at least. As soon as a DMA read command message is programmed, two pool buffers are deallocated as soon as possible in reserve for outbound data frames. This maintains the ability for outbound frames to ping-pong during the entire read command.

Pool data buffers can be used by the microprocessor to send 128 byte data frames. The microprocessor should first request allocation for a pool data buffer. Once allocated, the microprocessor should fill the pool buffer with an address followed by data. Pool buffers are preferably allocated to the microprocessor with less priority than to inbound and DMA transfers. However, if the DMA is not currently requiring outbound pool buffers, a pool buffer will be allocated to the microprocessor before a fourth pool buffer is allocated for inbound frames. This keeps the microprocessor from being indefinitely locked out of sending its data.

Each port 32, 34 has a control RAM (CRAM) 96 which contains pointers, control bytes, and additional information needed to access MRAM 92. CRAM 96 is a single-port, latched-based RAM structure. CRAM 96 operates twice as fast as MRAM 92 so that an access to CRAM 96 is synchronized with an access to MRAM 92. There is a single double word (four bytes) entry in CRAM 96 for each of the nine buffers in MRAM 92.

Each entry in CRAM 96 has a preferred format as illustrated in Table 2 below:

TABLE 2

| IPTR | OPTR | Control-Byte | NBytes |
|---|---|---|---|
| 1 byte | 1 byte | 1 byte | 1 byte |

The input pointer (IPTR) byte provides an address that is used to directly access MRAM 92. IPTR is used by channels filling a selected buffer, such as a data pool buffer, in MRAM 92. IPTR is reset to the first address of the frame buffer on the first double word write to each frame buffer. After a double word is written into the frame buffer of MRAM 92, IPTR is incremented by one to the next MRAM 92 address of the frame buffer.

The link CRC bytes may be partially written into MRAM 92 before the end-of-frame flag is detected. In this case, the IPTR and NBytes bytes are adjusted down to the correct value once the end-of-frame flag is detected.

The output pointer (OPTR) provides an address that is used to directly access MRAM 92. OPTR is used by channels emptying a selected buffer, such as a data pool buffer, in MRAM 92. OPTR is reset to the first address of the frame buffer on the first double word read of each frame buffer. This allows the OPTR to automatically reset itself when a frame buffer must be reread. After each double word is read from the selected frame buffer in MRAM 92, OPTR is incremented by one to the next MRAM 92 address of the selected frame buffer.

Once OPTR becomes equal to IPTR (IPTR is not reset until a selected frame buffer is allocated), the end-of-frame condition is recognized. During a link cut-through, OPTR is prevented from having a value that allows access to the "IPTR—1 double word" in order to prevent the outbound channel from sending the link CRC bytes before the IPTR is adjusted down.

The Control-Byte field is loaded with a control byte that corresponds to the frame stored in the selected frame buffer. On inbound frames, this byte is the actual control byte from the link. On outbound frames, the control byte is partially cleared and then modified by hardware with a new transmit sequence number.

The NBytes field specifies the number of bytes in the frame stored in the selected frame buffer of MRAM 92. As it is incremented, it is checked for too many bytes and end-of-frame conditions. A preferred look ahead scheme uses NBytes along with the number of bytes loaded into another inbound buffer to reject the frame when it is too long. When a frame is too long, MRAM 92 is protected from running over into the next buffer of MRAM 92 and the CRAM 96 IPTR/NBytes fields are not incremented. NBytes is adjusted down at the end of inbound frames where the CRC bytes are written to MRAM 92 before the end-of-frame flag is detected. All CRAM 96 fields are preferably self-initializing and do not require the microprocessor to write values on power-up.

CRAM 96 is preferably implemented with latches, and unused bits of some of the other fields of each entry in CRAM 96 are removed to save chip area. These bits should be written as a "0" and should be read as a "0".

Figure 4:
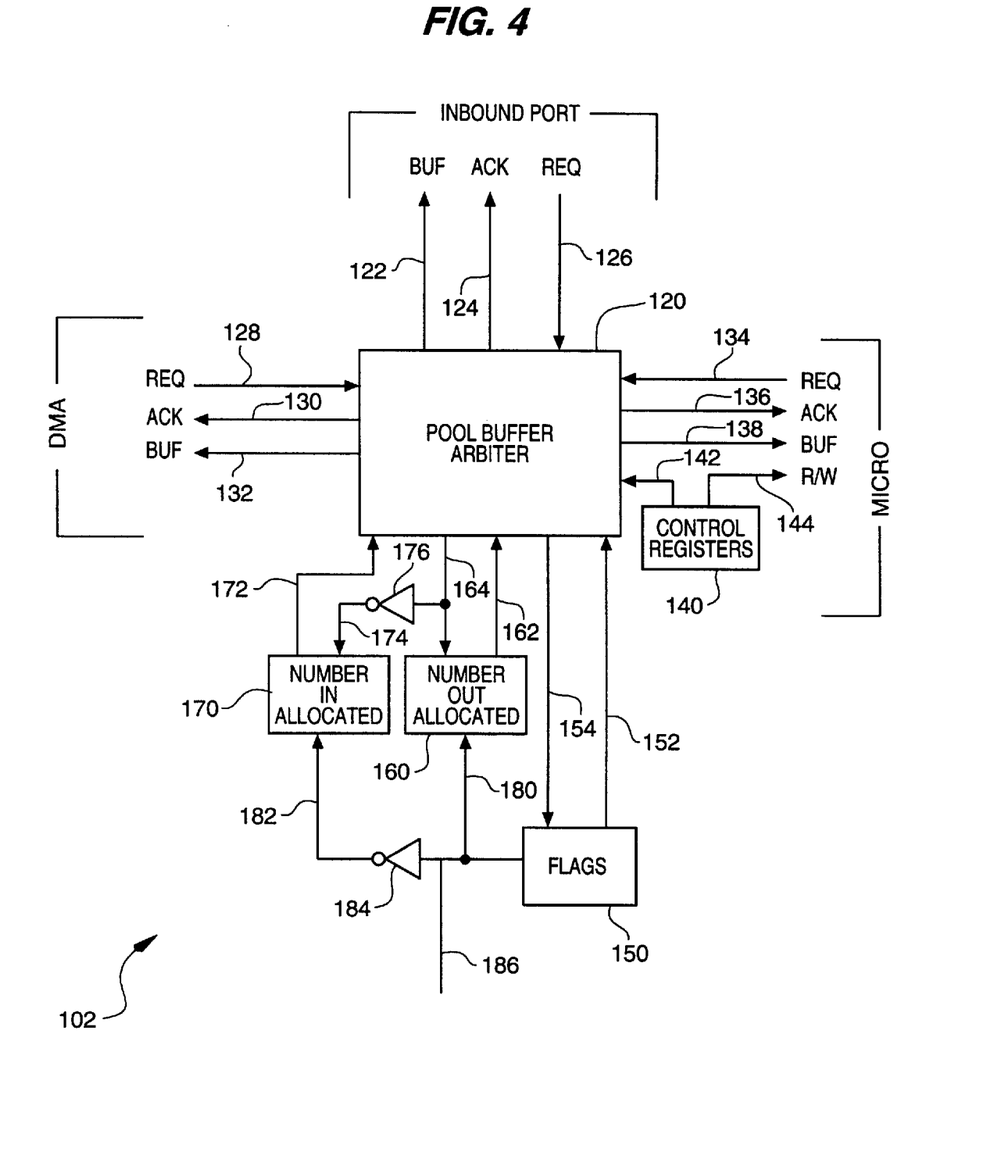
FIG. 4 is a block diagram of a buffer allocation control device shown in FIG. 3.

Referring to FIG. 4, a block diagram of the buffer allocation control device 102 shown in FIG. 3 is illustrated. A pool arbiter 120 is coupled to an inbound port (receiver 36 or 38 shown in FIG. 2) via leads 122, 124 and 126. The pool arbiter 120 is also coupled to the DMA via leas 128, 130 and 132, and a microprocessor via leads 134, 136 and 138. The pool arbiter 120 is coupled to control registers 140 via a lead 142. The microprocessor is coupled to control registers 140 via lead 144.

FLAGS 150 is coupled to pool arbiter 120 via leads 152 and 154. A counter 160 is coupled to pool buffer arbiter 120 via leads 162 and 164. A counter 170 is coupled to pool buffer arbiter 120 via lead 172 and lead 174 through an inverter 176. Counters 160, 170 are coupled to FLAGS 150 via respective leads 180 and 182. An inverter 184 is interposed to FLAGS 150 and counter 170.

The preferred operation of buffer allocation control 102 shown in FIG. 4 will be described with reference to the flow diagram shown in FIG. 5. At 200, the pool buffer arbiter 120 waits for a signal REQ. More specific with reference to FIG. 4, pool buffer arbiter 120 receives arbitration request signals REQ from an inbound port, the DMA and microprocessor. The inbound port requires inbound pool data buffers whereas the DMA and microprocessor require outbound pool data buffers.

Figure 5:
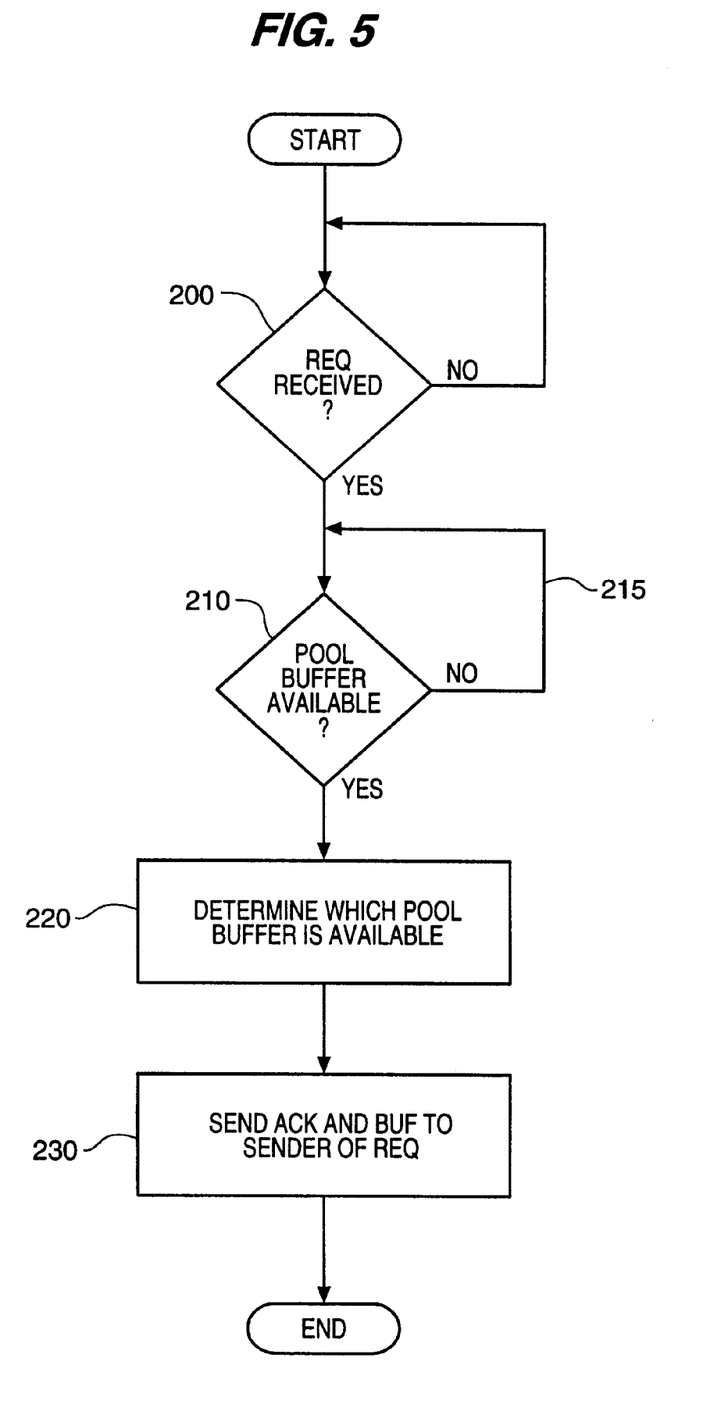
FIG. 5 is a flow diagram of the method of operation of the buffer allocation control device shown in FIG. 3.

Next in FIG. 5 at 210, pool buffer arbiter 120 determines if there is a pool data buffer available, either inbound or outbound depending on who made the request. Referring to FIG. 4, this determination is made by pool buffer arbiter 120 checking control registers 140 to determine, among other things, whether there is a limit set on the pool buffer allocation. Preferably, if a predetermined bit is set in control registers 140, then only two pool buffers can be allocated as inbound buffers. This always guarantees availability of two pool buffers for outbound frame transfers. If the bit is cleared, all four pool buffers can be allocated as inbound buffers when, for example, a DMA read is not active. It is also preferred that both ports 32, 34 operate in the same mode, i.e., whether two or all four pool buffers can be used as inbound buffers. The predetermined bit in control registers 140 is read from and written to by the microprocessor via lead 144.

Pool buffer arbiter 120 also checks counters 160 and 170 to determine if a pool buffer is available, depending on whether the pool buffer is to be used for inbound or outbound frames.

Turning to 220 in FIG. 5, pool arbiter 120 determines which pool buffer is available. To determine which pool buffers are available, pool buffer arbiter 120 checks FLAGS 150 to determine which pool buffers are allocated. Preferably, FLAGS 150 includes the following information: which pool buffers are currently allocated and whether the microprocessor is allocated a pool buffer, and which one, for use by firmware. Pool buffer arbiter 120 checks for the availability of pool buffers A, B, C and D, in that order. If a pool buffer is not available, the next pool buffer is checked.

There are preselected bits in FLAGS 150 that indicate for each pool buffer whether it is currently allocated to either an inbound or outbound transfer. Each bit is set when the corresponding pool buffer is assigned as an inbound or outbound buffer.

If there are no pool buffers available, pool buffer arbiter 120 waits until one becomes available as shown by line 215 in FIG. 5. If a pool buffer is available, then pool buffer arbiter 120 sets the bit in FLAGS 150 that corresponds to the allocated pool buffer. Pool buffer arbiter also adjusts counters 160, 170 according to whether the allocated pool buffer is for an inbound or outbound frame.

Pool buffer arbiter 120 then performs 230 in FIG. 5. Signal ACK acknowledges to the sender that its request is granted. Signal BUF is preferably the address to CRAM 96 that contains the address to the allocated pool buffer in MRAM 92.

It is preferred that a pool buffer is deallocated when a pool buffer allocated to an inbound DMA frame is completely transferred to the DMA. A pool buffer is also deallocated when a pool buffer allocated to an inbound DMA frame was received from the link, but the DMA write command was already completed. This may occur due to the initiator providing more frames than were in the command byte count, or due to the direct memory access being aborted during a DMA write command. In addition, a pool buffer is deallocated when an inbound pool buffer frame had a receiver error. This includes frame reject errors, link CRC errors, protocol errors, and the receipt of abort characters. On an abort, the pool buffer receiving the inbound frame is automatically deallocated by the inbound port. If the inbound frame was sent to the outbound port for a link cut-through, then the outbound pool buffer frame transfer is aborted and the frame is deallocated.

A pool buffer is deallocated when an inbound pool buffer for the DMA has a zero length data field. Frames without a data field which are destined for the DMA are accepted by the protocol but are deallocated by the frame buffer as soon as the link ACK occurs. However, frames destined for the microprocessor or for cut-through are handled as normal. This frame is discarded and not sent to the DMA.

A pool buffer is deallocated when an outbound pool buffer from the DMA is aborted by the DMA. This may occur when the DMA read transfer is aborted by either the microprocessor or due to a buffer CRC error. Deallocation also occurs when a Total/Absolute reset frame in the reset buffer is sent to the link.

Outbound frames can be aborted due to link cut-throughs which are aborted, or by a link error condition. In this case, the pool buffer involved is deallocated.

A specific example of the operation of buffer allocation control 102 will be explained with reference to FIG. 4. For purposes of this example, pool buffers A and B are allocated to an inbound port and pool buffers C and D are allocated to a DMA read. Counters 160 and 170 will each have a value of two. Also for purposes of this example, a minimum of two pool buffers must be available as inbound buffers. The minimum number of pool buffers allocated to any electronic device or other data source can be any value greater than or equal to zero.

If the microprocessor sends a signal REQ to pool arbiter 120 to allocate a pool buffer as an outbound buffer, pool buffer arbiter 120 checks counter 160. Preferably, this request is given less priority than hardware requests for inbound or outbound pool buffers except when no DMA operation is active. Since there are two pool buffers allocated as outbound, there are no more pool buffers available.

Due to ping-ponging, pool buffer C allocated to the DMA becomes available. The counter 160 is adjusted to have a value of one. The bit in FLAGS 150 corresponding to pool buffer C is cleared. Pool buffer arbiter senses the value in counter 160 and the cleared bit in FLAGS 150, and allocates pool buffer C to the microprocessor.

Pool buffer arbiter 120 then adjusts the value of counter 160 to two to reflect that there are two pool buffers allocated as outbound buffers. Pool buffer arbiter 120 also sets the bit in FLAGS 150 that corresponds to pool buffer C to reflect that it is allocated. Pool buffer arbiter 120 will also set bits in FLAGS 150 to reflect that pool buffer C is allocated to the microprocessor.

Pool buffer arbiter 120 signals the microprocessor with signal ACK to confer the allocation of pool buffer C and with signal BUF that is the address in CRAM 96 (FIG. 2) which contains the address of pool buffer C in MRAM 92.

Once the microprocessor receives the signals ACK and BUF, a request will be made to access MRAM 92 in FIG. 3. The microprocessor will supply a write request signal and the CRAM address (BUF) to RAM port arbiter 98. RAM port arbiter 98 determines the priority of the requester. Preferably, the microprocessor has less priority than the DMA or inbound port.

After the microprocessor is granted access to MRAM 92, RAM port arbiter 98 provides the BUF address to CRAM 96, which in turn outputs an address to MRAM 92 via lead 94. The output address corresponds to the first double-word of pool buffer C. RAM port arbiter 98 also supplies to MRAM 92 signals that enable the microprocessor frame to be written into pool buffer C. RAM port arbiter 98 toggles access to the two ports of MRAM 92, where one port is dedicated to the DMA and SMS automation channels, and the other port is dedicated to inbound and outbound port frames and microprocessor outbound frames. The microprocessor frame is provided to MRAM 92 via lead 110 to the port dedicated to the inbound/outbound frames.

Once the frame in pool buffer C is written, the microprocessor (requester) initiates a transfer of the frame to the destination port, either 32 or 34. Subsequently, the data is read from pool buffer C. The destination port deallocates pool buffer C by adjusting the counter 160 to a value of one to reflect that there is now a pool buffer available. Furthermore, the relevant bits in FLAGS 150 are cleared by the destination port so that the status of pool buffer C is non-allocated, i.e., the microprocessor does not have a pool buffer allocated to it.

It is preferred that a pool buffer is allocated to the microprocessor before the fourth inbound pool buffer is allocated to either the inbound port or the DMA. In addition, it is preferred that the microprocessor requests allocation for a pool buffer each time it wishes to send a frame.

Pool buffer allocation begins for two outbound buffers when a DMA read command starts. The allocation for an inbound buffer begins when a request is received from the link by an initiator and successfully verified.

The previous discussion about the operation of the buffer allocation control describes dynamically allocating the pool buffers. One important aspect of the dynamic allocation of the pool buffers is to minimize the average length of time where an outbound or inbound channel (DMA and microprocessor or port) will wait for two buffers to be allocated for its transfer. Having at least two buffers available for either the inbound or outbound channel provides the best performance advantage since one pool buffer can be receiving while the other is transmitting (ping-ponging).

In view of this, it is preferred that the minimum number of inbound pool buffers are not allocated as dedicated pool buffers, but are dynamically allocated. Thus, whichever pool buffer is available is allocated subject to the preferred mode that a minimum of two pool buffers are allocated for inbound frames.

The dynamic allocation of pool buffers for one frame buffer is preferably independent of the dynamic allocation of pool buffers for the other frame buffer. Thus, the minimum number of pool buffers that are allocated as inbound can be the same or different for each frame buffer. Also, the number of pool buffers for each frame buffer can be the same or different.

A further advantage of the present invention is that the use of two MRAMs each having pool buffers allows for all four buffers of one MRAM to be used for inbound frames from a port and allows for two pool buffers from the other MRAM to be used for outbound frames to that port. In this manner, the SSA can be concurrently receiving from and transmitting to the same link via one port even after two inbound buffers have been allocated.

Another configuration of FIG. 4 eliminates counters 160 and 170, and the corresponding leads. Pool buffer arbiter 120 then includes circuitry that determines how many pool buffers are allocated as inbound and outbound by checking the status of the pool buffers in FLAGS 150. In addition, FLAGS 150 can include circuitry to store which device (DMA or inbound port) is allocated to which pool buffer.

Numerous variations and modifications of the embodiment described above may be effected without departing from the spirit and scope of the novel features of the invention. It is to be understood that no limitations with respect to the specific device illustrated herein are intended or should be inferred. It is, of course, intended to cover by the appended claims all such modifications as fall within the scope of the claims.

We claim:

1. A frame buffer for data communication between electronic devices comprising:

a main memory including pool buffers for storing data, the main memory capable of receiving information from electronic devices for storage in the pool buffers; and a buffer allocation control coupled to receive requests from the electronic devices to allocate pool buffers for the received information and to provide addresses that correspond to the allocated pool buffers, wherein a minimum number of the pool buffers are allocable for one of inbound and outbound data that is less than a total number of the pool buffers and a remaining number of the pool buffers are allocable for the inbound and outbound data, the main memory stores the received information in the allocated pool buffers in response to the addresses provided to the electronic devices.

2. A method of allocating pool buffers for inbound and outbound data comprising the steps of:

allocating a minimum number of the pool buffers for inbound data that is less than a total number of the pool buffers;

allocating a remaining number of the pool buffers for the inbound and outbound data; and providing addresses, that correspond to the allocated pool buffers, to electronic devices capable of data transmissions therebetween.

3. The method of claim 2 wherein the steps of allocating are dynamic.

4. A method of allocating pool buffers of at least two frame buffers for inbound and outbound data comprising the steps of:

independently allocating a minimum number of the pool buffers of each of the frame buffers for the inbound data that is less than a total number of the pool buffers; and independently allocating a remaining number of the pool buffers of each of the frame buffers for the inbound and outbound data.

5. The method of claim 4 wherein the steps of allocating are dynamic.

6. A method of allocating pool buffers, in a serial interface including ports and frame buffers and coupled between electronic devices, for inbound and outbound data comprising the steps of:

allocating a minimum number of pool buffers in each frame buffer for the inbound data; and allocating a remaining number of pool buffers in each frame buffer for one of the inbound and outbound data.

7. The method of claim 6 wherein the allocating steps are done independently for each frame buffer.

8. The method of claim 6 wherein the allocating steps are dynamic.

* * * * *